(12) United States Patent
Kwak et al.

(10) Patent No.: US 6,934,245 B2
(45) Date of Patent: Aug. 23, 2005

(54) APPARATUS AND METHOD FOR DETERMINING USE/NONUSE OF TRANSMIT DIVERSITY BY P-CCPCH IN AN NB-TDD CDMA MOBILE COMMUNICATION SYSTEM

(75) Inventors: Yong-Jun Kwak, Yongin-shi (KR); Hyeon-Woo Lee, Suwon-shi (KR); Byung-Jae Kwak, Songnam-shi (KR); Kook-Heui Lee, Songnam-shi (KR); Jae-Yoal Kim, Kunpo-shi (KR); Ju-Ho Lee, Daejeon-kwangyeok-shi (KR); Jung-Je Son, Seoul (KR)

(73) Assignee: Samsung Electronics Co., Ltd. (KR)

( * ) Notice: Subject to any disclaimer, the term of this patent is extended or adjusted under 35 U.S.C. 154(b) by 802 days.

(21) Appl. No.: 09/973,904

(22) Filed: Oct. 9, 2001

(65) Prior Publication Data

US 2002/0060996 A1 May 23, 2002

(30) Foreign Application Priority Data

Oct. 6, 2000 (KR) ........................................ 2000-58955

(51) Int. Cl.$^7$ ................................................ H04J 9/00
(52) U.S. Cl. ...................................... 370/204; 370/441
(58) Field of Search ................................. 370/204, 215, 370/441, 442, 478–480, 503; 375/130, 271, 149–150, 302, 322

(56) References Cited

U.S. PATENT DOCUMENTS 6,356,555 B1 * 3/2002 Rakib et al. ................. 370/441
6,563,856 B1 * 5/2003 O'Shea et al. .............. 375/130

* cited by examiner

Primary Examiner—Duc Ho
Assistant Examiner—Phuongchau Ba Nguyen
(74) Attorney, Agent, or Firm—Dilworth & Barrese LLP

(57) ABSTRACT

An apparatus and method for phase modulating SYNC codes transmitted over downlink pilot time slots DwPTSs when a primary common control physical channel P-CCPCH is transmitted using transmit diversity in an NB-TDD CDMA mobile communication system. The apparatus and method transmits and receives the P-CCPCH signal using the transmit diversity by providing a diversity indicator for changing phase variation of the SYNC codes included in the DwPTSs.

28 Claims, 5 Drawing Sheets

APPARATUS AND METHOD FOR DETERMINING USE/NONUSE OF TRANSMIT DIVERSITY BY P-CCPCH IN AN NB-TDD CDMA MOBILE COMMUNICATION SYSTEM

PRIORITY

This application claims priority to an application entitled "Apparatus and Method for Determining Use/Nonuse of Transmit Diversity by P-CCPCH in an NB-TDD CDMA Mobile Communication System" filed in the Korean Industrial Property Office on Oct. 6, 2000 and assigned Serial No. 2000-58955, the contents of which are hereby incorporated by-reference.

BACKGROUND OF THE INVENTION

1. Field of the Invention

The present invention relates generally to transmit diversity in an NB-TDD CDMA (Narrow Band Time Division Duplexing Code Division Multiple Access) mobile communication system, and in particular, to an apparatus and method for determining whether transmit diversity is used by a signal transmitted over a primary common control physical channel (P-CCPCH), a downlink channel.

2. Description of the Related Art

In general, "transmit diversity" or "transmission diversity" refers to a scheme for transmitting the same information through a plurality of antennas for accurate transmission of the information. The transmit diversity is chiefly used for a channel transmitting important information that should not be transmitted incorrectly.

FIG. 1 illustrates a multiframe structure used in an NB-TDD CDMA mobile communication system. Referring to FIG. 1, a multiframe is comprised of a plurality of frames, and information by P-CCPCH is transmitted over only first and second frames of the multiframe. The information transmitted by the P-CCPCH includes BCH (Broadcast Channel) information. That is, the BCH information is transmitted over the P-CCPCH in a period where a data symbol with a downlink time slot #0 of each subframe is transmitted. The structure of the multiframe is represented by reference numeral 101. Reference numeral 102, i.e. a radio frame, shows a structure of the first frame among a plurality of the frames constituting the multiframe 101. The second frame for transmitting information through the P-CCPCH also has the same structure as shown by the reference numeral 102. Each frame shown by the reference numeral 102 has a length of 10 ms, and is comprised of two subframes.

Reference numeral 103 shows a structure of one subframe of the two subframes contained in radio frame 102. Each subframe 103 has a length of 5 ms and includes 7 time slots Ts0–Ts6. The respective time slots are used for uplink transmission or downlink transmission. Each time slot is available for unidirectional transmission, i.e., for either uplink transmission or downlink transmission. How many time slots out of the 7 time slots in one subframe are to be used for the uplink transmission or downlink transmission, can be arbitrarily set by the system operator. Between the first time slot and the second time slot, there exist a 96-chip downlink pilot time slot (DwPTS), a 96-chip guard period (GP) and a 160-chip uplink pilot time slot (UpPTS). The DwPTS is used for initial cell search, random access, synchronization or channel estimation at a UE (User Equipment). The UpPTS is used for uplink synchronization and channel estimation at a UTRAN (UMTS (Universal Mobile Telecommunication System) Terrestrial Radio Access Network).

Reference numeral 104 shows a detailed structure of the first time slot Ts0 and the DwPTS, shown by subframe 103. Each time slot has a total length of 864 chips (=1,675 µs) as shown by the reference numeral 104. The time slot is comprised of two 352-chip data symbol periods, a 144-chip midamble period intervening therebetween, and a 16-chip guard period (GP). For the time slots transmitted from the UTRAN over the downlink, the midamble signal is used by the UE to determine which channels are transmitted from the UTRAN and to estimate a channel environment between the UE and the UTRAN. In addition, for the time slots transmitted from the UE over the uplink, the midamble signal is used by the UTRAN to determine which UE is transmitting the channel and to estimate a channel environment between the UE and the UTRAN. The midamble signal is associated with a specific uplink/downlink channel, and can be used in determining which channel or which subscriber transmits the channel. The GP has a 16-chip length, and serves to separate the time slots.

The DwPTS, as shown by the reference numeral 104, is comprised of a total of 96 chips. The 96-chip DwPTS is divided into a 32-chip GP and a 64-chip synchronization (SYNC) code. The SYNC code is used not only to acquire synchronization but also to indicate information on the first time slot in one subframe.

The NB-TDD CDMA mobile communication system transmits a broadcast channel (BCH), a transport channel, through the P-CCPCH. The BCH information is necessary for UTRAN synchronization and UTRAN information acquisition process.

FIG. 2 illustrates a cell search process, the UTRAN synchronization and UTRAN information acquisition process. As illustrated in FIG. 2, the cell search process can be divided into 4 steps: a first step of receiving information on a serving UTRAN to which the UE currently belongs, a second step of identifying a scrambling code and a basic midamble code in use, a third step of acquiring multiframe synchronization, and a fourth step of accessing information transmitted over the broadcast channel.

Referring to FIG. 2, in DwPTS search step (Step 201), the UE searches for signals received at the DwPTS for a SYNC code using a matched filter. There exist a total of 32 kinds of the SYNC codes, and the SYNC codes are used for synchronization between the UE and the UTRAN. Since each UTRAN uses a specific one of the 32 SYNC codes, the UE should identify the SYNC code used by the serving UTRAN to which it currently belongs.

After recognizing the SYNC code used by the serving UTRAN in Step 201, the UE performs a step of identifying a scrambling code mapped with a basic midamble code on a one-to-one basis. Step 202 of FIG. 2 corresponds to a step of identifying the scrambling code and the basic midamble code. One SYNC code is associated with four basic midamble codes, and since the UE continuously receives the midamble signals from the synchronized UTRAN, the UE identifies one of the four basic midamble codes, which is matched to the UTRAN. The "midamble signals" refer to codes obtained by separating a 256-chip code determined by consecutively combining two 128-chip basic midamble codes, in a unit of 144-chip length at stated periods. Therefore, by continuously receiving the midamble signals, the UE determines which midamble code is matched to the UTRAN. By recognizing the basic midamble code, the UE identifies the scrambling code used by the UTRAN. This is because the basic midamble code is mapped with the scrambling code on a one-to-one basis.

After searching for the SYNC code, the basic midamble code and the scrambling code used by the serving UTRAN in Steps 201 and 202, the UE performs a multiframe synchronization step (Step 203). In this step, the UE acquires synchronization of the multiframe comprised of 16 frames (or 32 subframes). That is, the UE searches for the head and the tail of the multiframe. In Step 203, the UE finds out a frame position where the P-CCPCH signal is transmitted according to a pattern of respective phase demodulation values, by performing QPSK (Quadrature Phase Shift Keying) phase demodulation on the signal received at the DwPTS. In this manner, the UE is informed as to which is the first frame of the multiframe. Since the P-CCPCH is transmitted over the first and second frames of the multiframe, the UE can acquire multiframe synchronization by finding out the position of the P-CCPCH signal. The signals received at the DwPTSs of the respective frames constituting one multiframe are QPSK phase modulated in order, so that the UE can search for the head (start) and the tail (end) of the multiframe.

In Step 204, the UE reads BCH information. Through Step 201 and 202, the synchronization between the UE and the UTRAN is acquired and the UE is acquainted with the scrambling code used by the UTRAN. After step 203, the multiframe synchronization, the UE acquires information on the UTRAN by receiving the P-CCPCH signal included in the respective first time slots of the first and second frames of the multiframe, completing the cell search process.

As stated above, the existing NB-TDD CDMA mobile communication system does not yet consider using transmit diversity for the signal transmitted over the P-CCPCH. This is because a downlink dedicated physical channel (DL-DPCH) is generally transmitted to the respective UEs through beam forming, so that intra-cell interference is relatively low. Therefore, the system is based on the fact that the common channels are not required to use the transmit diversity.

However, when interference increases in a congested area such as a downtown or in a situation where inter-cell interference is inevitable, a transmission gain of the common channels such as the P-CCPCH should be increased according to circumstances. Therefore, when the P-CCPCH does not use the transmit diversity, it is not possible to obtain a high transmission gain. Thus, in order to easily increase the transmission gain, it is preferable to use transmission diversity. However, up to date, no definition has been made on such a method.

SUMMARY OF THE INVENTION

It is, therefore, an object of the present invention to provide an apparatus and method for transmitting a P-CCPCH signal using transmit diversity in an NB-TDD CDMA mobile communication system.

It is another object of the present invention to provide an apparatus and method for obtaining a high transmission gain by using the transmit diversity for a P-CCPCH signal.

It is further another object of the present invention to provide an apparatus and method for phase-modulating a signal transmitted over DwPTS according to use/nonuse of the transmit diversity for transmission of a P-CCPCH signal during multiframe synchronization, thereby allowing a UE to identify use/nonuse of the transmit diversity.

In accordance with one aspect of the present invention, there is provided an apparatus for indicating enablement of transmit diversity in a UTRAN for an NB-TDD CDMA mobile communication system, wherein a plurality of frames constituting a multiframe each include two subframes, each of said subframes include a plurality of time slots each having data symbol fields scrambled with a given scrambling code and a midamble field indicating the given scrambling code, also included is a downlink pilot time slot having a synchronization code, intervening between first and second time slots of said plurality of time slots, wherein two adjacent frames make a pair. The apparatus indicates enablement of transmit diversity through at least two antennas by phase modulation of the synchronization codes in the downlink pilot time slots in each frame pair. The apparatus includes a transmit diversity enable/disable controller for storing a plurality of patterns each comprised of a plurality of different phase modulation angles to indicate enablement of the diversity transmission, and sequentially outputting the phase modulation angles by the diversity transmission in a unit of the patterns; and a multiplier for phase modulating the synchronization codes sequentially received in a unit of a predetermined number of chips with the phase modulation angles output from the transmit diversity enable/disable controller on a one-to-one basis, and outputting the phase-modulated synchronization codes as the synchronization codes in the downlink pilot time slots in each frame pair.

In accordance with another aspect of the present invention, there is provided an apparatus for determining enablement/nonenablement of transmit diversity in a UE for an NB-TDD CDMA mobile communication system, wherein a plurality of frames constituting a multiframe each include two subframes, each of said subframes include a plurality of time slots each having data symbol fields scrambled with a given scrambling code and a midamble field indicating the given scrambling code, also included is a downlink pilot time slot having a synchronization code, intervening between first and second time slots of said plurality of time slots, wherein two adjacent frames make a pair. The apparatus determines enablement/nonenablement of diversity transmission depending on phase modulation angles of the synchronization codes in the downlink pilot time slots in each frame pair. The apparatus includes a phase demodulator for searching for the phase modulation angles of the synchronization codes in the downlink pilot time slots in each frame pair; and a transmit diversity detector for storing a plurality of first patterns each comprised of a plurality of different first phase modulation angles to indicate enablement of the transmit diversity, storing a plurality of second patterns each comprised of a plurality of different second phase modulation angles to indicate nonenablement of the transmit diversity, said second patterns being different from the first patterns, and determining use/nonuse of the transmit diversity by comparing the phase modulation angles searched by the phase demodulator with the first and second phase modulation angles of the first and second patterns.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

A method for transmitting BCH information over P-CCPCH using transmit diversity according to the present invention adopts QPSK modulation so that a combination of phases indicates the BCH information during phase modulation of signals transmitted at DwPTSs in respective subframes. That is, the signals transmitted at the DwPTSs are subjected to QPSK phase modulation using phases of the respective combinations by varying the respective phases.

Figure 1:
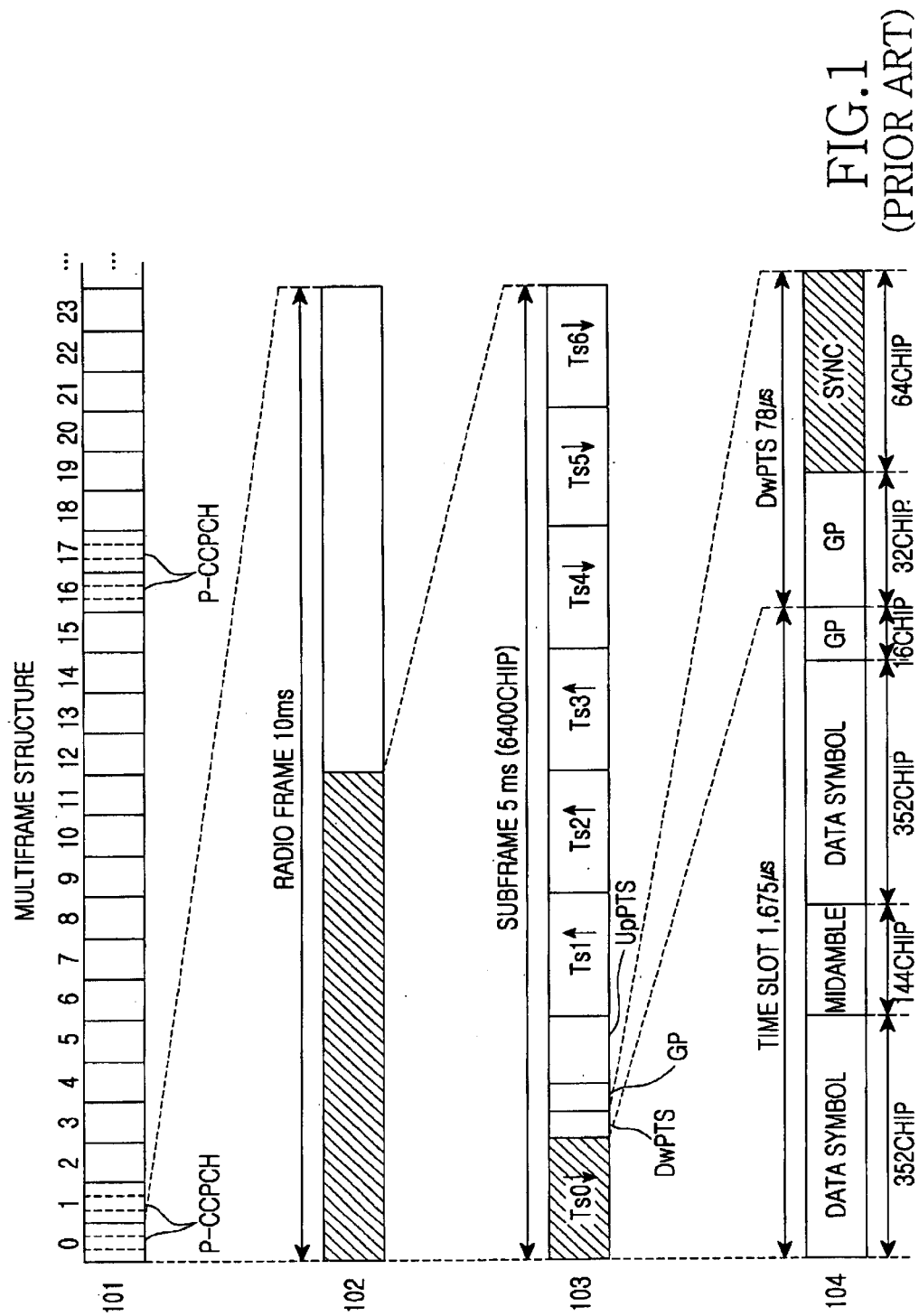
FIG. 1 is a diagram illustrating a multiframe structure used in a general NB-TDD CDMA mobile communication system.

At present, the NB-TDD CDMA mobile communication system uses the 64-chip SYNC code in the signal received at DwPTS, shown by the reference numeral 104 of FIG. 1, for synchronization of the multiframe. In the multiframe structure, the SYNC codes have a specific phase modulation rule at 16-frame periods. Table 1 below shows a phase modulation rule of the signals transmitted at the DwPTSs where the SYNC codes are included. As to the 64-chip SYNC codes, the SYNC codes of the respective subframes are phase modulated according to a first phase modulation angle pattern of Table 1. For example, if the phase modulation angle pattern has the first phase modulation angle pattern '45,225,225,225' of Table 1, the SYNC codes of the respective subframes are subjected to the phase modulation in the following manner. The SYNC code in the first subframe of the first frame is phase modulated at an angle of 45°, and the SYNC code in the second subframe of the first frame is phase modulated at an angle of 225°. Further, the SYNC code belonging to the first subframe of the second frame is phase modulated at an angle of 225°, and the SYNC code belonging to the second subframe of the second frame is also phase modulated at an angle of 225°. In the same manner, the SYNC codes belonging to the subframes of the third and fourth frames are phase modulated at angles of 45°, 135°, 135° and 225°, respectively, according to the second pattern '45,135,135,225' of Table 1. Subsequently, a phase modulation pattern for the SYNC codes belonging to the subframes of the fifth and sixth frames is given '45,135, 225,135' of Table 1. Therefore, phase modulation for the SYNC codes belonging to the multiframe is performed with reference to the phase modulation patterns of Table 1. Meanwhile, the UE searches for phase modulation angles by demodulating the SYNC codes received at the DwPTSs, and thus, can easily determine the position where the current frame is located in the multiframe structure.

TABLE 1

| Phase Modulation Angle (4*64 chips = 256 chips) | (SFN/2) mod 8 |
|---|---|
| 45,225,225,225 | 0 (BCH exists here) |
| 45,135,135,225 | 1 |
| 45,135,225,135 | 2 |
| 45,315,225,315 | 3 |
| 45.225.135,315 | 4 |
| 45,225,315,315 | 5 |
| 45,225,225,135 | 6 |
| 45,225,225,315 | 7 |

The invention changes the phase modulation rule in the multiframe synchronization process based on the phase modulation angles, so that the UE can identify use/nonuse of the transmit diversity on the P-CCPCH. In this case, there are four available modulation angles of 45°, 135°, 255° and 315°, the angle 45° being fixed. That is, the phase modulation angle of the SYNC code included in the first subframe of each frame is fixed to 45°. Therefore, the number of combinations of the phase modulation angles of the SYNC codes included in the remaining three subframes other than the first subframe is 3*3*3=27. Therefore, it is possible to further make 19 combinations in addition to the 8 phase modulation angle combinations shown in Table 1. The invention searches for the best combination out of the 19 extra combinations and uses the searched combination as an indicator combination in a transmit diversity mode where the transmit diversity is used. That is, in order to indicate use of the transmit diversity by the signal transmitted over the P-CCPCH through the combination of the phase modulation angles of the SYNC codes transmitted at the DwPTSs, 8 combinations are required, which do not overlap with the combinations of the phase modulation angles in a non-transmit diversity mode where the transmit diversity is not used. That is, the non-overlapped phase modulation patterns can be used as indicators indicating use of the transmit diversity for the P-CCPCH.

Figure 3:
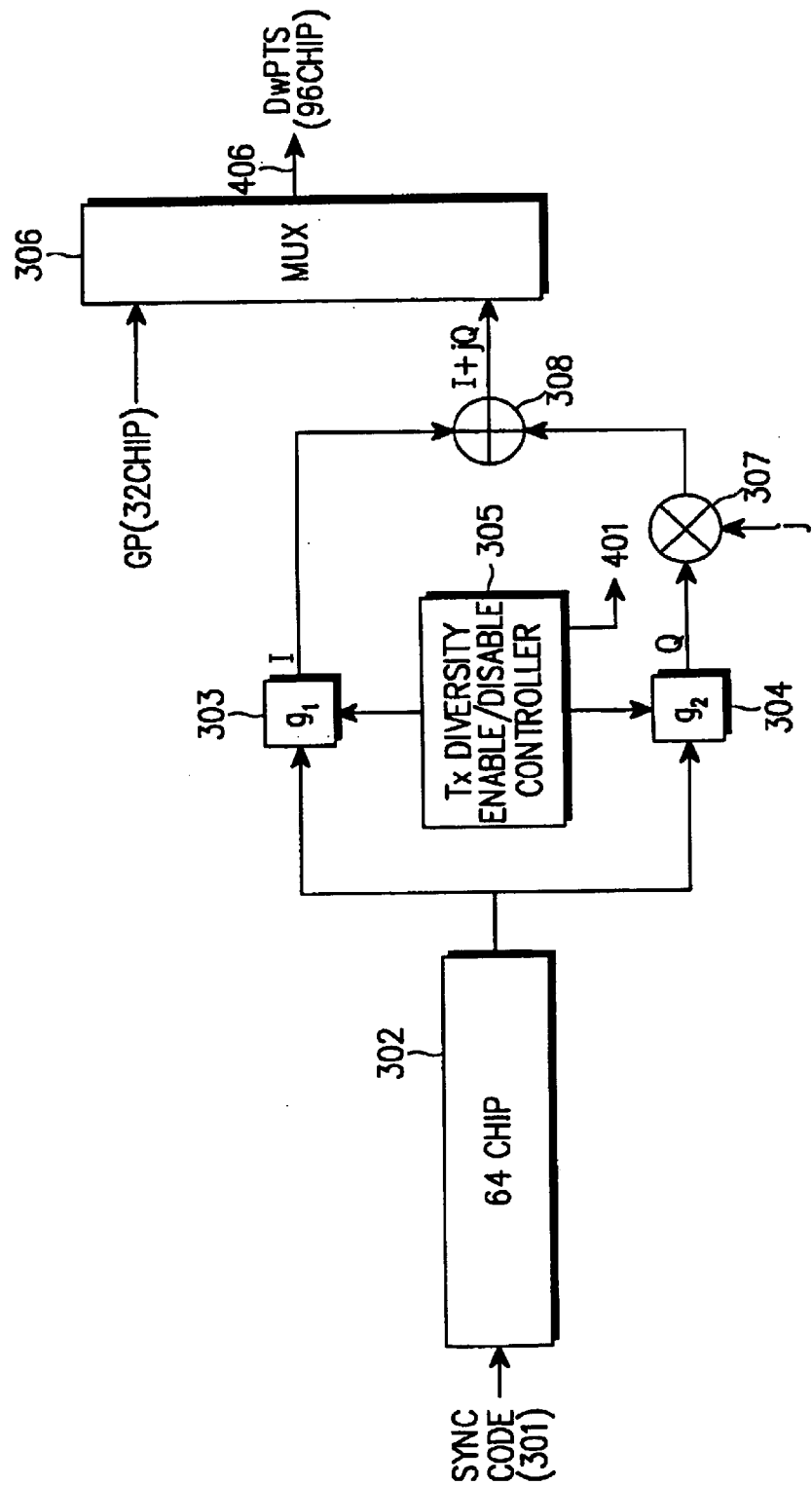
FIG. 3 is a diagram illustrating a scheme for creating a downlink pilot time slot (DwPTS) in an NB-TDD CDMA communication system according to an embodiment of the present invention.

FIG. 3 illustrates a scheme for creating a downlink pilot time slot (DWPTS) in an NB-TDD CDMA communication system according to an embodiment of the present invention. Referring to FIG. 3, reference numeral 301 indicates a SYNC code, which is comprised of 64 chips and divided into an I channel and a Q channel. The two channels are multiplied by phase modulation values $g_1$ and $g_2$ associated with the phase modulation angles defined in Table 1, respectively. When the transmit diversity is used, the channels should be multiplied by the values proper to the phase modulation values which will be described in the following embodiments. That is, the I channel is multiplied by $g_1$ in an I channel phase modulator 303, and the Q channel is multiplied by $g_2$ in a Q channel phase modulator 304. The values $g_1$ and $g_2$ used in the device are defined in Table 2 below. A transmit diversity enable/disable controller 305 controls the $g_1$ and $g_2$ according to the values defined in Table 2. That is, the transmit diversity enable/disable controller 305 designates the $g_1$ and $g_2$ as the values defined in the following embodiments according to use/nonuse of the transmit diversity. The transmit diversity enable/disable controller 305 should store in its internal memory a table for the respective phase modulation values $g_1$ and $g_2$ in the non-transmit diversity mode, and a table for the respective phase modulation values $g_1$ and $g_2$ in the transmit diversity mode. That is, the transmit diversity enable/disable controller 305 provides the phase modulation values $g_1$ and $g_2$ to the I channel phase modulator 303 and the Q channel phase modulator 304, respectively, by consulting the phase modulation angles stored in the internal memory, based on whether the transmit diversity is applied to the transmission signal on the P-CCPCH.

The Q channel signal output from the Q channel phase modulator 304 is multiplied by j in a multiplier 307, and then, added by an adder 308 to the I channel signal output from the I channel phase modulator 303. The added signal I+jQ is time-multiplexed with a 32-chip GP signal by a multiplexer (MUX) 306, creating a signal to be transmitted over the DwPTS. The signal output from the multiplexer 306 is provided to a time multiplexer 406 of FIG. 4.

TABLE 2

| Phase Modulation Angle | $g_1$ | $g_2$ |
|---|---|---|
| 45 | 1 | 1 |
| 135 | −1 | 1 |
| 225 | −1 | −1 |
| 315 | 1 | −1 |

Figure 4:
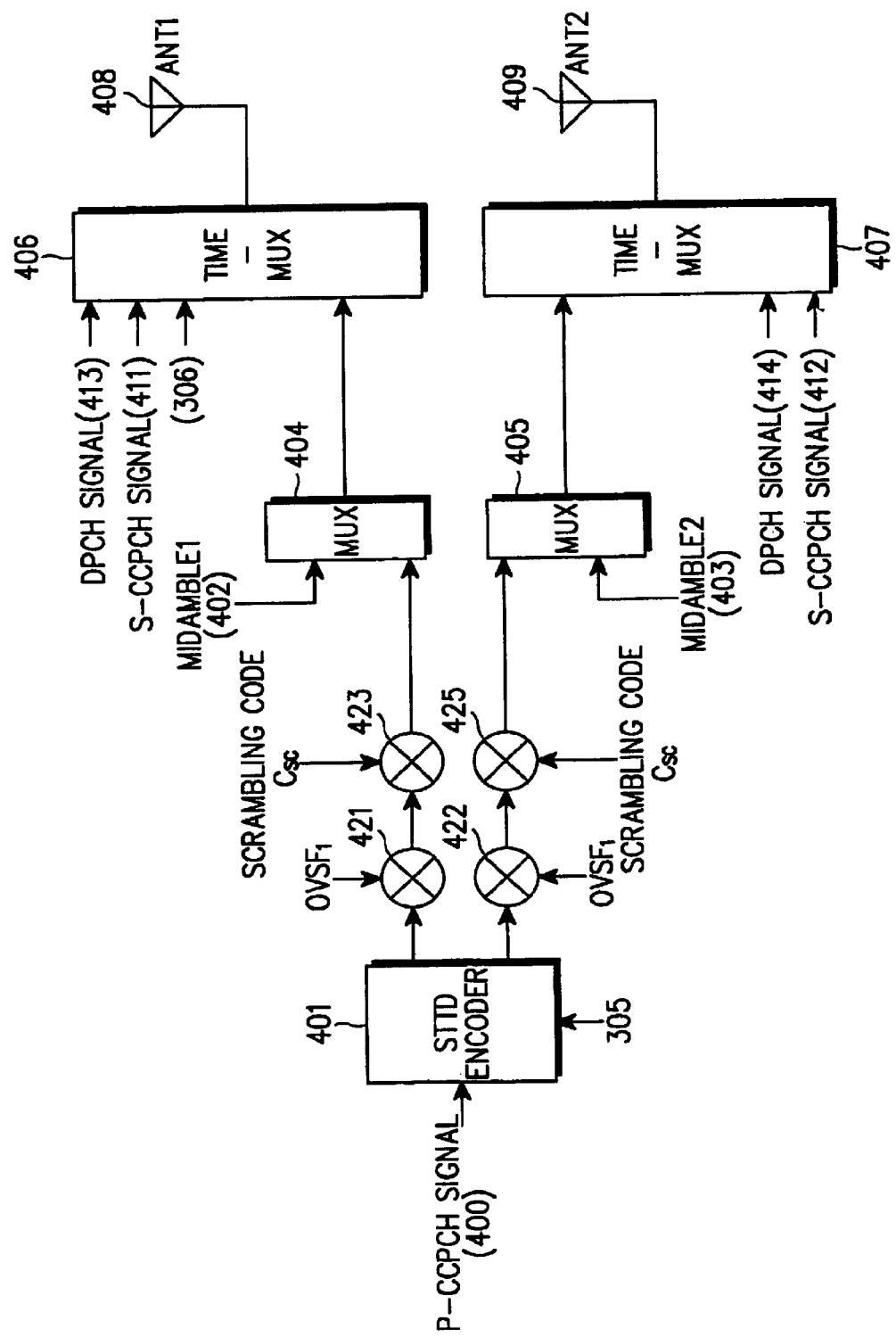
FIG. 4 is a diagram illustrating a structure of a UTRAN transmitter for transmitting a primary common control physical channel (P-CCPCH) signal based on use/nonuse of the transmit diversity according to an embodiment of the present invention.

Since no specification has been made on the transmit diversity, the NB-TDD system can use a transmit diversity scheme shown in FIG. 4, for the transmit diversity. The scheme shown in FIG. 4 supports the block space-time transmit diversity (STTD) for the P-CCPCH used in a W-TDD (Wideband Time Division Duplexing) CDMA mobile communication system. Referring to FIG. 4, an STTD encoder 401 creates one or two orthogonal signals using a received P-CCPCH signal 400. Specifically, the STTD encoder 401, under the control of the transmit diversity enable/disable controller 305 of FIG. 3, creates two orthogonal signals by receiving the P-CCPCH signal, when the transmit diversity is used. However, in the normal state where the transmit diversity is not used, the STTD encoder 401 outputs the intact P-CCPCH signal as a first output. In this case, a second output is not used. The transmit diversity enable/disable controller 305 provides values based on a pattern of the phase modulation values of the SYNC code signals to be transmitted over the DwPTS, regardless of which transmit diversity will be used by the UTRAN.

In the following description, it will be assumed that the transmit diversity is used. When the transmit diversity is used, the block STTD encoder 401 outputs two orthogonal signals. The orthogonal signals are multiplied by the same OVSF (Orthogonal Variable Spreading Factor) code $OVSF_1$ in multipliers 421 and 422, and then, scrambled with the same scrambling code $C_{SC}$ in multipliers 423 and 425. An output signal of the multiplier 423 is multiplexed with a first midamble 402 in a multiplexer 404, and an output signal of the multiplier 425 is multiplexed with a second midamble 403 in a multiplexer 405. Although the same code is used herein for the first and second midambles, it is also possible to use different codes. The signal multiplexed by the multiplexer 404 is multiplexed with different channel signals by a time multiplexer 406. The output signal (the signal transmitted over the DwPTS) of the multiplexer 306, a secondary common control physical channel (S-CCPCH) signal 411, and a dedicated physical channel (DPCH) signal 413 are time-multiplexed by the time multiplexer 406. The multiplexed signals have been subjected to encoding, channelization and scrambling. The output of the time multiplexer 406 is transmitted through a first antenna (ANT1) 408. Similarly, the output of the multiplexer 405 is also time-multiplexed with a DPCH signal 414 and an S-CCPCH signal 412 by a time multiplexer 407, and then, transmitted through a second antenna (ANT2) 409. Like the signals transmitted over the P-CCPCH, the signals transmitted over the DPCH 414 and the S-CCPCH 412 also have been subjected encoding, channelization and scrambling in the transmit diversity mode.

Figure 2:
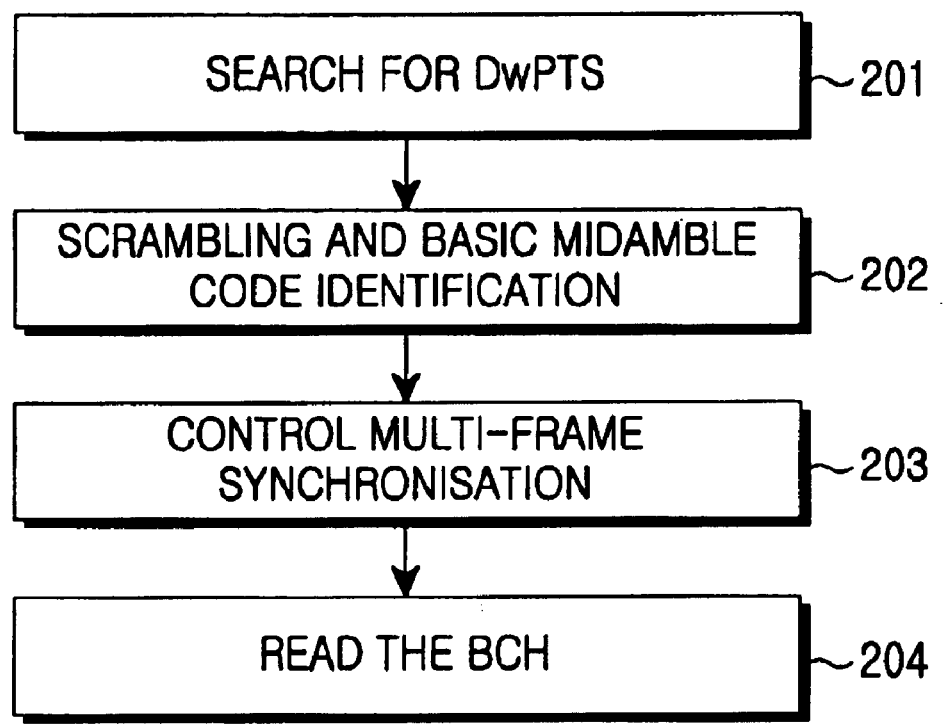
FIG. 2 is a flowchart illustrating a general cell search process in the NB-TDD CDMA mobile communication system.

The UE can search for the phase angles modulated by the UTRAN through QPSK demodulation on the signal received over the DwPTS in the multiframe synchronization process (Step 203 of FIG. 2). Through a combination of the searched phase modulation angles, the UE determines whether the signal received over the P-CCPCH in Step 204 of FIG. 2 has used the transmit diversity.

Figure 5:
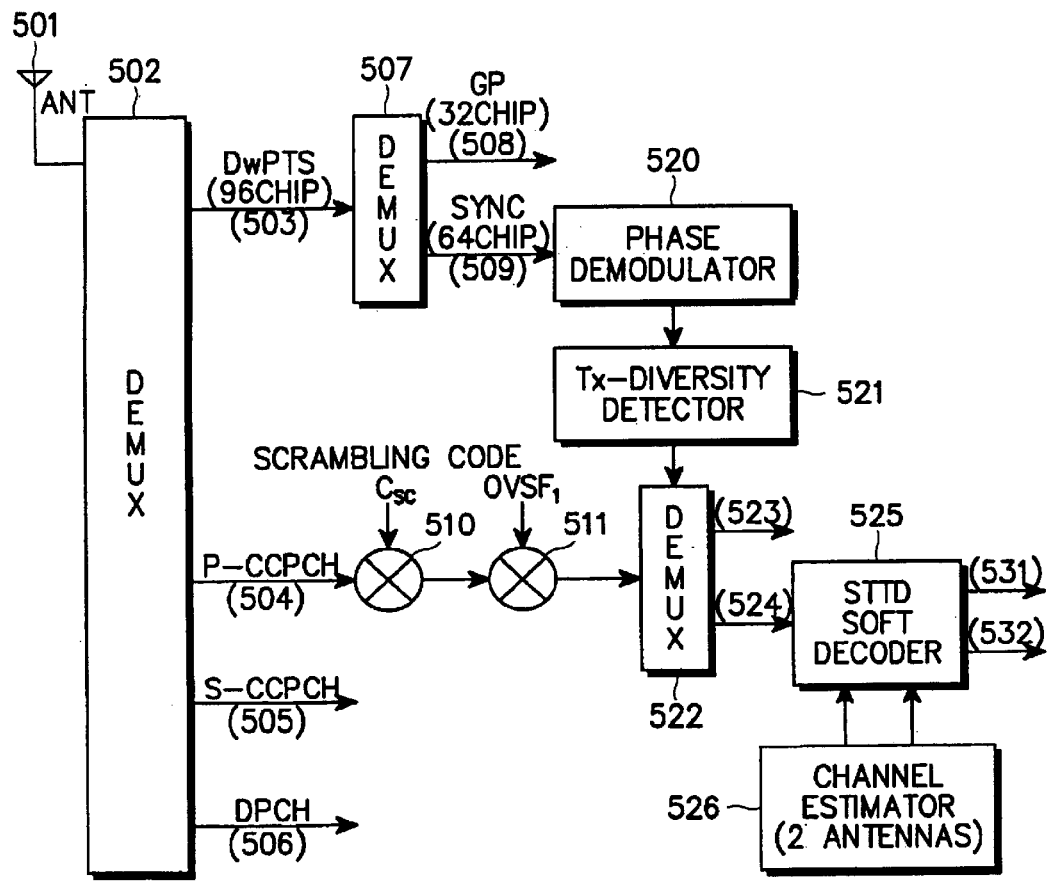
FIG. 5 is a diagram illustrating a structure of a UE receiver for receiving a P-CCPCH signal based on use/nonuse of the transmit diversity according to an embodiment of the present invention.

FIG. 5 illustrates how the UE processes signals received from the UTRAN according to an embodiment of the present invention. Referring to FIG. 5, a signal received from an antenna 501 is demultiplexed by a demultiplexer 502 into a signal received at the DwPTS 503, a signal received over a P-CCPCH 504, a signal received over an S-CCPCH 505, and a signal received over a DPCH 506. The signal received at the DwPTS 503 is demultiplexed again by a demultiplexer 507 into a 32-chip GP signal 508 and a 64-chip SYNC code 509. Since the SYNC code 509 was QPSK modulated, a phase demodulator 520 searches for a phase modulation angle of the SYNC code. Based on the phase modulation angle searched by the phase demodulator 520, a transmit diversity detector 521 determines whether or not the P-CCPCH currently uses the transmit diversity. Like the transmit diversity enable/disable controller 305 of FIG. 3, the transmit diversity detector 521 should store in its internal memory a table for the phase modulation angles in the non-transmit diversity mode, and a table for the phase modulation angles in the transmit diversity mode. That is, the transmit diversity detector 521 searches the table for the phase modulation angles in the transmit diversity mode and the table for the phase modulation angles in the non-transmit diversity mode, stored in its internal memory where the demodulated phase modulation angles from the phase demodulator 520 are stored. By comparing the phase modulation angles of the received SYNC code signals through the search, the transmit diversity detector 521 determines whether the signal transmitted from the UTRAN over the P-CCPCH has used the transmit diversity, and also determines over which frame the signal has been transmitted in a multi frame structure. The transmit diversity detector 521 provides a control signal to a demultiplexer 522 based on the determined results.

The P-CCPCH 504 demultiplexed by the demultiplexer 502 is descrambled with a scrambling code $C_{SC}$ by a multiplier 510. The descrambled P-CCPCH is descrambled again with an OVSF code $OVSF_1$ by a multiplier 511, and then, provided to the demultiplexer 522. The scrambling code $C_{SC}$ and the OVSF code $OVSF_1$ are identical to those used in the transmitter.

The demultiplexer 522 generates an output signal 523 upon receipt of a control signal indicating nonuse of the transmit diversity from the transmit diversity detector 521. However, the demultiplexer 522 generates an output signal 524 upon receipt of a control signal indicating use of the transmit diversity from the transmit diversity detector 521. When the transmit diversity is used, i.e., upon receipt of the control signal indicating use of the transmit diversity, the demultiplexer 522 outputs the output signal 524, which is STTD-decoded by an STTD soft decoder 525, generating output signals 531 and 532. The STTD soft decoder 525 performs STTD decoding depending on a channel estimation signal provided from a channel estimator 526.

In an alternative embodiment, even though the UTRAN has transmitted the signal using another transmit diversity technique, the transmit diversity detector 521 determines whether the above-stated another transmit diversity is used depending on the phase modulation angle pattern of the SYNC codes received over the DwPTS, regardless of which transmit diversity technique the UTRAN has used.

A method for determining use/nonuse of the transmit diversity according to an embodiment of the present invention will now be described. In the following description, there are shown 8 patterns which do not overlap with the phase modulation angle pattern in the non-transmit diversity mode, to indicate use of the transmit diversity by the signal transmitted over the P-CCPCH according to a phase modulation pattern of the SYNC codes transmitted over the DwPTS. In addition, the 8 non-overlapped patterns should also not overlap with one another. Unlike the embodiment below, any patterns will do as long as they do not overlap with the pattern in the non-transmit diversity mode, and they also do not overlap with one another. The phase modulation angle pattern in the transmit diversity mode is fixed to a phase modulation angle of the SYNC code in the first subframe. It is possible to use, as an indicator indicating use/nonuse of the transmit diversity, 8 patterns out of the remaining 19 patterns obtained by excluding 8 patterns associated with nonuse of the transmit diversity from 27 patterns where the remaining 3 phase modulation angles are used as phase modulation angles of the SYNC codes of the next subframes. In the following embodiment, it is also possible to fix the phase modulation angle of the SYNC code of the first subframe to 45°, and use one of the remaining 19 patterns as a transmit diversity indicator.

In the following embodiment, the phase modulation angles shown in Table 3 below are used. That is, the phase modulation angles of the SYNC code of the first subframe in 4 consecutive subframes using one phase modulation angle combination regardless of use/nonuse of the transmit diversity are all fixed to 45°, and the phase modulation angles of the SYNC codes of the next 3 subframes are changed to any of 135°, 225° and 315°. Therefore, there are a total of 3*3*3=27 available patterns. When the transmit diversity is used, it is possible to select 8 patterns among 27−8=19 patterns and use the 8 selected patterns for the phase modulation angles. Table 3 shows an embodiment of the present invention, in which the phase modulation angle of the SYNC code of the first subframe is fixed to 45° regardless of use/nonuse of the transmit diversity and the phase modulation angles of the SYNC codes of the next 3 subframes are changed to new values.

TABLE 3

| Phase Modulation Angle | | |
| --- | --- | --- |
| Tx Diversity Unused | Tx Diversity Used | (SFN/2) mod 8 |
| 45,225,225,225 | 45,135,135,135 | 0 |
| 45,135,135,225 | 45,315,315,225 | 1 |
| 45,135,225,135 | 45,315,135,225 | 2 |
| 45,315,225,315 | 45,135,315,225 | 3 |
| 45.225.135,315 | 45,225,135,135 | 4 |
| 45,225,315,315 | 45,225,315,315 | 5 |
| 45,225,225,135 | 45,135,225,225 | 6 |
| 45,225,225,315 | 45,315,225,225 | 7 |

As described above, when transmitting P-CCPCH, a kind of the common channels, using the transmit diversity, the UTRAN transmits information on use/nonuse of the transmit diversity along with the signal. Therefore, it is possible to increase a transmission gain in a noisy area in case of using the transmit diversity, thus improving common channel receiving performance. In addition, the UE can easily determine use/nonuse of the transmit diversity, making it possible to improve the receiving performance without a modification in the existing device.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for indicating enablement of transmit diversity of primary common control physical channel in a CDMA (Narrow Band Time Division Duplexing Code Division Multiple Access) mobile communication system, wherein a plurality of frames constituting a multiframe each include two subframes, each of said subframes including (i) a plurality of time slots each having data symbol fields scrambled with a given scrambling code and a midamble field indicating the given scrambling code, and (ii) a downlink pilot time slot having a synchronization code, intervening between first and second time slots of said plurality of time slots, wherein two adjacent frames make a frame pair, the apparatus indicating enablement of transmit diversity through at least two antennas by phase modulation of the synchronization codes in the downlink pilot time slots in each frame pair, the apparatus comprising:

a transmit diversity enable/disable controller for storing a plurality of patterns each comprised of a plurality of different phase modulation angles to indicate enablement of the transmit diversity, and sequentially outputting the phase modulation angles according to the usage of the transmit diversity in a unit of the patterns; and a multiplier for phase modulating the synchronization codes sequentially received in a unit of a predetermined number of chips with the phase modulation angles output from the transmit diversity enable/disable controller on a one-to-one basis, and outputting the phase-modulated synchronization codes as the synchronization codes in the downlink pilot time slots in each frame pair.

2. The apparatus as claimed in claim 1, wherein the transmit diversity enable/disable controller stores a plurality of patterns each comprised of a plurality of different phase modulation angles to indicate nonenablement of the transmit diversity, said patterns being different from the patterns stored to indicate enablement of the transmit diversity, and sequentially outputs the phase modulation angles in the pattern unit based on the nonenablement of the transmit diversity.

3. The apparatus as claimed in claim 2, wherein the patterns include 8 different patterns each comprised of 4 phase modulation angles.

4. The apparatus as claimed in claim 2, wherein a first phase modulation angle of the phase modulation angles of the patterns is 45°.

5. The apparatus as claimed in claim 4, wherein the phase modulation angles other than the first phase modulation angle of each pattern are determined by a combination of 135°, 225° and 315°.

6. The apparatus as claimed in claim 1, wherein the predetermined number of chips is 64.

7. An apparatus for determining enablement/nonenablement of transmit diversity in CDMA mobile communication system, wherein a plurality of frames constituting a multiframe each include two subframes, each of said subframes including (i) a plurality of time slots each having data symbol fields scrambled with a given scrambling code and a midamble field indicating the given scrambling code, and (ii) a downlink pilot time slot having a synchronization code, intervening between first and second time slots of said plurality of time slots, wherein two adjacent frames make a frame pair, the apparatus determining enablement/nonenablement of transmit diversity depending on phase modulation angles of the synchronization codes in the downlink pilot time slots in each frame pair, the apparatus comprising:

a phase demodulator for searching for the phase modulation angles of the synchronization codes in the downlink pilot time slots in each frame pair; and a transmit diversity detector for storing a plurality of first patterns each comprised of a plurality of different first phase modulation angles to indicate enablement of the transmit diversity, storing a plurality of second patterns each comprised of a plurality of different second phase modulation angles to indicate nonenablement of the diversity transmission, said second patterns being different from the first patterns, and determining use/nonuse of the transmit diversity by comparing the phase modulation angles searched by the phase demodulator with the first and second phase modulation angles of the first and second patterns.

8. The apparatus as claimed in claim 7, wherein the first and second patterns include 8 different patterns each comprised of 4 phase modulation angles.

9. The apparatus as claimed in claim 7, wherein a first phase modulation angle of the phase modulation angles of each pattern is 45°.

10. The apparatus as claimed in claim 9, wherein the phase modulation angles other than the first phase modulation angle of each pattern are determined by a combination of 135°, 225° and 315°.

11. A method for indicating enablement of transmit diversity CDMA mobile communication system, wherein a plurality of frames constituting a multiframe each include two subframes, each of said subframes including (i) a plurality of time slots each having data symbol fields scrambled with a given scrambling code and a midamble field indicating the given scrambling code, and (ii) a downlink pilot time slot having a synchronization code, intervening between first and second time slots of said plurality of time slots, wherein two adjacent frames make a frame pair, the method indicating enablement of transmit diversity through at least two antennas by phase modulation of the synchronization codes in the downlink pilot time slots in each frame pair, the method comprising the steps of:

storing a plurality of patterns each comprised of a plurality of different phase modulation angles to indicate enablement of the transmit diversity, and sequentially outputting the phase modulation angles by the diversity transmission in a unit of the patterns; and phase modulating the synchronization codes sequentially received in a unit of a predetermined number of chips with the phase modulation angles sequentially output in the pattern unit on a one-to-one basis, and outputting the phase-modulated synchronization codes as the synchronization codes in the downlink pilot time slots in each frame pair.

12. The method as claimed in claim 11, further comprising the step of storing a plurality of patterns each comprised of a plurality of different phase modulation angles to indicate nonenablement of the diversity transmission, said patterns being different from the patterns stored to indicate enablement of the transmit diversity, and sequentially outputting the phase modulation angles in the pattern unit based on the nonenablement of the transmit diversity.

13. The method as claimed in claim 12, wherein the patterns include 8 different patterns each comprised of 4 phase modulation angles.

14. The method as claimed in claim 12, wherein a first phase modulation angle out of the phase modulation angles of the patterns is 45°.

15. The method as claimed in claim 14, wherein the phase modulation angles other than the first phase modulation angle of each pattern are determined by a combination of 135°, 225° and 315°.

16. The method as claimed in claim 11, wherein the predetermined number of chips is 64.

17. A method for determining enablement/nonenablement of transmit diversity in a CDMA mobile communication system, wherein a plurality of frames constituting a multiframe each include two subframes, each of said subframes including (i) a plurality of time slots each having data symbol fields scrambled with a given scrambling code and a midamble field indicating the given scrambling code, and (ii) a downlink pilot time slot having a synchronization code, intervening between first and second time slots of said plurality of time slots, wherein two adjacent frames make a frame pair, the method determining enablement/nonenablement of diversity transmission depending on phase modulation angles of the synchronization codes in the downlink pilot time slots in each frame pair, the method comprising the steps of:

searching for the phase modulation angles of the synchronization codes in the downlink pilot time slots in each frame pair; and storing a plurality of first patterns each comprised of a plurality of different first phase modulation angles to indicate enablement of the transmit diversity, storing a plurality of second patterns each comprised of a plurality of different second phase modulation angles to indicate nonenablement of the transmit diversity, said second patterns being different from the first patterns, and determining use/nonuse of the transmit diversity by comparing the phase modulation angles searched by phase demodulation with the first and second phase modulation angles of the first and second patterns.

18. The method as claimed in claim 17, wherein the first and second patterns include 8 different patterns each comprised of 4 phase modulation angles.

19. The method as claimed in claim 17, wherein a first phase modulation angle of the phase modulation angles of each pattern is 45°.

20. The method as claimed in claim 19, wherein the phase modulation angles other than the first phase modulation angle of each pattern are determined by a combination of 135°, 225° and 315°.

21. An apparatus for transmitting a primary common control physical channel (P-CCPCH) signal using transmit diversity in a UTRAN for a CDMA mobile communication system, comprising:

a block space-time transmit diversity (STTD) encoder for outputting first and second signals being orthogonal with each other by performing STTD encoding on a received P-CCPCH signal;

a first multiplier for spreading the first signal with a given orthogonal code;

a second multiplier for spreading an output of the first multiplier with a given scrambling code;

a first multiplexer for multiplexing an output of the second multiplier and a first midamble indicating the given scrambling code;

a downlink pilot time slot generator for outputting a downlink pilot time slot by phase modulating synchronization codes received in a unit of a predetermined number of chips with a plurality of different phase modulation angles for indicating enablement of the diversity transmission;

a second multiplexer for multiplexing an output of the first multiplexer and the downlink pilot time slot, and outputting the multiplexed results through one of two antennas used for the transmit diversity;

a third multiplier for spreading the second signal with the given orthogonal code;

a fourth multiplier for spreading an output of the third multiplier with the given scrambling code; and a third multiplexer for multiplexing an output of the fourth multiplier and a second midamble being different from the first midamble indicating the given scrambling code, and outputting the multiplexed results through another one of the two antennas.

22. The apparatus as claimed in claim 23, wherein the downlink pilot time slot generator comprises:

a transmit diversity enable/disable controller for storing a plurality of patterns each comprised of a plurality of different phase modulation angles to indicate enablement of the diversity transmission, and sequentially outputting the phase modulation angles in a unit of the patterns by the transmit diversity; and a multiplier for phase modulating the synchronization codes sequentially received in a unit of a predetermined number of chips with the phase modulation angles output from the transmit diversity enable/disable controller on a one-to-one basis, and outputting the phase-modulated results as the synchronization codes in the downlink pilot time slots in each frame pair.

23. The apparatus as claimed in claim 22, wherein the transmit diversity enable/disable controller stores a plurality of patterns each comprised of a plurality of different phase modulation angles to indicate nonenablement of the transmit diversity, said patterns being different from the patterns stored to indicate enablement of the transmit diversity, and sequentially outputs the phase modulation angles in the pattern unit based on the disablement of the transmit diversity.

24. A method for transmitting a primary common control physical channel (P-CCPCH) signal using transmit diversity from a UTRAN to a UE in a CDMA mobile communication system, comprising the steps of:

outputting first and second signals being orthogonal with each other by performing STTD encoding on a received P-CCPCH signal;

spreading the first signal with a given orthogonal code, and spreading the spread first signal with a given scrambling code;

multiplexing the spread first signal and a first midamble indicating the given scrambling code;

generating a downlink pilot time slot by phase modulating synchronization codes received in a unit of a predetermined number of chips with a plurality of different phase modulation angles for indicating enablement of the diversity transmission;

multiplexing the multiplexed first midamble and the downlink pilot time slot, and outputting the multiplexed results through one of two antennas used for the transmit diversity;

spreading the second signal with the given orthogonal code, and spreading the spread second signal with the given scrambling code; and multiplexing the spread second signal and a second midamble being different from the first midamble indicating the given scrambling code, and outputting the multiplexed results through another one of the two antennas.

25. The method as claimed in claim 24, wherein the downlink pilot time slot generation step comprises the steps of:

storing a plurality of patterns each comprised of a plurality of different phase modulation angles to indicate enablement of the transmit diversity, and sequentially outputting the phase modulation angles in a unit of the patterns according to the use of transmit diversity; and phase modulating the synchronization codes sequentially received in a unit of a predetermined number of chips with the phase modulation angles output from a transmit diversity enable/disable controller on a one-to-one basis, and outputting the phase-modulated results as the synchronization codes in the downlink pilot time slots.

26. The method as claimed in claim 25, further comprising the step of storing a plurality of patterns each comprised of a plurality of different phase modulation angles to indicate nonenablement of the transmit diversity, said patterns being different from the patterns stored to indicate enablement of the transmit diversity, and sequentially outputting the phase modulation angles in the pattern unit based on the disablement of the transmit diversity.

27. An apparatus for determining enablement/nonenablement of transmit diversity in a CDMA mobile communication system, wherein a plurality of frames constituting a multiframe each include two subframes, each of said subframes including (i) a plurality of time slots each having data symbol fields scrambled with a given scrambling code and a midamble field indicating the given scrambling code, and (ii) a downlink pilot time slot having a synchronization code, intervening between first and second time slots of said plurality of time slots, wherein two adjacent frames make a frame pair, the apparatus determining enablement/nonenablement of transmit diversity depending on phase modulation angles of the synchronization codes in the downlink pilot time slots in each frame pair, the apparatus comprising:

a first demultiplexer for receiving a plurality of frames, and demultiplexing the received frames into the scrambled data symbols and the downlink pilot time slots;

a second demultiplexer for receiving the downlink pilot time slots from the first demultiplexer and demultiplexing each of the received downlink pilot time slots into a guard period and the synchronization code;

a phase demodulator for receiving the synchronization codes from the second demultiplexer and searching for phase modulation angles used for phase modulation of the synchronization codes;

a transmit diversity detector for storing a plurality of first patterns each comprised of a plurality of different first phase modulation angles to indicate enablement of the transmit diversity, storing a plurality of second patterns each comprised of a plurality of different second phase modulation angles to indicate nonenablement of the transmit diversity, said second patterns being different from first patterns, and determining use/nonuse of the transmit diversity by comparing the phase modulation angles searched by the phase demodulator with the first and second phase modulation angles of the first and second patterns;

a first multiplier for multiplying the scrambled data symbols received from the first demultiplexer with the scrambling code determined by the midamble to descramble the data symbols;

a second multiplier for multiplying the descrambled data symbols from the first multiplier with a given orthogonal code to despread the data symbols;

a third demultiplexer for demultiplexing the data symbols despread by the second multiplier according to a signal output from the transmit diversity detector;

a channel estimator for generating a channel estimation signal for the frames; and an STTD decoder for receiving data symbols from the third demultiplexer due to use of the transmit diversity, and STTD decoding the received data symbols with the channel estimation signal provided from the channel estimator.

28. A method for determining enablement/nonenablement of transmit diversity in a CDMA mobile communication system, wherein a plurality of frames constituting a multiframe each include two subframes, each of said subframes including (i) a plurality of time slots each having data symbol fields scrambled with a given scrambling code and a midamble field indicating the given scrambling code, and (ii) a downlink pilot time slot having a synchronization code, intervening between first and second time slots of said plurality of time slots, wherein two adjacent frames make a frame pair, the method determining enablement/nonenablement of transmit diversity depending on phase modulation angles of the synchronization codes in the downlink pilot time slots in each frame pair, the method comprising the steps of:

receiving a plurality of frames, and demultiplexing the received frames into the scrambled data symbols and the downlink pilot time slots;

receiving the downlink pilot time slots and demultiplexing each of the received downlink pilot time slots into a guard period and the synchronization code;

receiving the demultiplexed synchronization codes and searching for phase modulation angles used for phase modulation of the synchronization codes;

storing a plurality of first patterns each comprised of a plurality of different first phase modulation angles to indicate enablement of the transmit diversity, storing a plurality of second patterns each comprised of a plurality of different second phase modulation angles to indicate nonenablement of the transmit diversity, said second patterns being different from first patterns, and determining use/nonuse of the transmit diversity by comparing the searched phase modulation angles with the first and second phase modulation angles of the first and second patterns;

receiving the scrambled data symbols and descrambling the received scrambled data symbols with the scrambling code determined by the midamble;

despreading the descrambled data symbols with a given orthogonal code;

demultiplexing the despread data symbols according to whether the diversity transmission is used or not; and STTD decoding, if the transmit diversity is used, the data symbols with a channel estimation signal for the frames.

* * * * *

UNITED STATES PATENT AND TRADEMARK OFFICE
CERTIFICATE OF CORRECTION

PATENT NO. : 6,934,245 B2
DATED : August 23, 2005
INVENTOR(S) : Yong-Jun Kwak et al.

It is certified that error appears in the above-identified patent and that said Letters Patent is hereby corrected as shown below:

<u>Title page,</u>
Item [75], Inventors, "Jae-Yoal KIM" should be -- Jae-Yoel KIM --.

Signed and Sealed this

Second Day of May, 2006

JON W. DUDAS
*Director of the United States Patent and Trademark Office*